US007509571B2

(12) United States Patent
Rank et al.

(10) Patent No.: US 7,509,571 B2
(45) Date of Patent: Mar. 24, 2009

(54) METHOD AND APPARATUS FOR A FILE FORMAT FOR STORING SPREADSHEET COMPACTLY

(75) Inventors: Paul J. Rank, San Jose, CA (US); David J. Proulx, San Jose, CA (US); Mingchi Stephen Mak, Belmont, CA (US); Herbert T. Ong, Cupertino, CA (US); Akhil K. Arora, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 517 days.

(21) Appl. No.: 09/756,642

(22) Filed: Jan. 3, 2001

(65) Prior Publication Data

US 2002/0124016 A1 Sep. 5, 2002

(51) Int. Cl.
 *G06F 15/00* (2006.01)
 *G06F 17/00* (2006.01)
(52) U.S. Cl. ........................ 715/212; 715/214; 715/219; 715/220; 715/249
(58) Field of Classification Search ................ 715/503, 715/504, 523
See application file for complete search history.

(56) References Cited

U.S. PATENT DOCUMENTS

| 5,055,998 | A | * | 10/1991 | Wright et al. ............... 715/503 |
| 5,280,575 | A | * | 1/1994 | Young et al. ................ 715/504 |
| 5,319,777 | A | * | 6/1994 | Perez ........................... 707/10 |
| 5,463,724 | A | * | 10/1995 | Anderson et al. ........... 715/503 |
| 5,551,055 | A |   | 8/1996 | Matheny et al. |
| 5,778,370 | A | * | 7/1998 | Emerson ...................... 707/100 |
| 5,933,796 | A | * | 8/1999 | Ashida et al. ................ 702/181 |
| 5,974,372 | A |   | 10/1999 | Barnes et al. |
| 6,292,810 | B1 | * | 9/2001 | Richards ...................... 715/503 |
| 6,360,214 | B1 | * | 3/2002 | Ellis et al. ....................... 707/2 |
| 6,487,597 | B1 | * | 11/2002 | Horie et al. .................. 709/227 |
| 6,510,499 | B1 | * | 1/2003 | Aaker .......................... 711/154 |
| 6,613,098 | B1 | * | 9/2003 | Sorge et al. .................. 715/503 |
| 6,735,593 | B1 | * | 5/2004 | Williams ..................... 707/102 |
| 6,820,093 | B2 | * | 11/2004 | de la Huerga ............ 707/104.1 |

FOREIGN PATENT DOCUMENTS

EP    1 014 262 A2    6/2000

OTHER PUBLICATIONS

Crespo, Arturo; Garcia-Molina, Hector; Archival Storage for Digital Libraries; May 1998; ACM Press; International Conference on Digital Libraries, Proceedings of the third ACM conference on Digital libraries; pp. 69-78.*

* cited by examiner

*Primary Examiner*—Doug Hutton
*Assistant Examiner*—Nathan Hillery
(74) *Attorney, Agent, or Firm*—Sonnenschein Nath & Rosenthal LLP

(57) ABSTRACT

Methods and Systems in accordance with the present invention provide a file format for storing spreadsheets compactly on PDAs. PDAs only contain a limited amount of computer memory due to their small size and processing ability. To reduce memory constraints caused by PDA spreadsheet applications, the present invention reduces memory allocated for file storage by optimizing the compression of individual spreadsheet files within a database record storage system. This method and system in accordance with the present invention uses a collection of records to represent a spreadsheet file.

14 Claims, 10 Drawing Sheets

| Name (Last, First) | Hours Worked | Rate/Hour | Gross Pay | FICA | SDI | Net Pay |
|---|---|---|---|---|---|---|
| Adams, John | 50.25 | 35 | 1758.75 | 100.24 | 53.86 | 1604.65 |
| Blue, Sally | 54.3 | 45 | 2443.5 | 124.23 | 56.78 | 2262.49 |
| Hallaway, Tom | | | | | | |
| Morgan, Tracy | 53.7 | 45 | 2416.5 | 113.92 | 52.79 | 2249.79 |
| Swift Robert | 57 | 50 | 2850 | 124.4 | 57.53 | 2668.07 |
| Wade, Susan | | | | | | |
| Total | | | 9468.75 | 462.79 | 220.96 | 8785 |

FIGURE 9

METHOD AND APPARATUS FOR A FILE FORMAT FOR STORING SPREADSHEET COMPACTLY

BACKGROUND

1. Field of the Invention

This invention relates to the field of computer software, and in particular to a method and apparatus for a file format for storing spreadsheets compactly.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all rights whatsoever.

2. Background Art

Personal Digital Assistants (PDAs) are small hand-held computers that perform numerous tasks and functions. PDAs are versatile devices that users carry and operate almost anywhere. Despite all of their advantages, a major limitation of PDAs is that they possess a limited amount of computer memory. Therefore, when users want to use memory intensive applications, such as a spreadsheet program, they encounter problems.

In addition, many PDA's utilize record based storage for applications and data storage. A record may have a fixed size that is only partially used and therefore wastes potential storage space. In other instances, a record may be used to represent non-data containing elements of an application. Thus, the use of record based storage leads to a number of inefficiencies in storage of spreadsheet files and other memory intensive applications.

Due to PDA memory constraints, sometimes users remove other non-related programs on their PDAs to compensate for memory shortages created by operating PDA spreadsheet applications. Thus, when users remove other non-related programs, it limits the versatility of their PDAs to operate other software applications. These problems and others associated with current PDA systems, relating to storage, display, and performance, are better understood by a more detailed review.

PDAs

A personal digital assistant is a small computer-like device, which typically has a base housing, an input mechanism, and a miniature display screen. The typical configuration of the PDA mounts these components on the topside of the device. The base housing of the PDA contains a small microprocessor, limited data storage and memory areas, a storage battery, and other various miniature electronic components. The electronic components and other features vary depending on the particular model and manufacturer of the PDA.

The input mechanisms of some PDAs utilize a miniature keyboard. Alternatively, the miniature display screen mounted on the PDA is able to operate as an input mechanism. When acting as an input mechanism, the display screen uses a pen-like stylus or other writing implement to introduce input via the display screen. The display assembly senses the position of the tip of the stylus on the viewing screen and provides this positional information to the central processing unit of the PDA. In addition to sensing motion commands, some display assemblies can also sense varying degrees of pressure that the stylus places on the screen of the PDA.

On the other hand, the display screen is also able to operate as an output mechanism. The output of the PDA has many forms. For example, one form of visual output includes graphic and/or textual images that the PDA presents to the user on the display screen. Another form of output is in the form of sound that the PDA provides to the user through a speaker. Additionally, some PDAs can package information for output through cable or wireless networks.

Conventional PDAs also contain an operating system and other programs, such as word processing, spreadsheet, e-mail, calendar, memo list, stylus pen applications, and other related applications. The increasing popularity of PDAs stems from their relatively low cost and extreme portability compared to much larger desktop general-purpose computers ("desktop CPUs"). Many users find that for simple computing tasks during trips and other periods of being away from their larger computer devices, the bulk and computing power of even a compact notebook computer are simply not needed.

To encapsulate all of this functionality into such a small device, trade-offs invariably occur. One trade-off is that PDAs do not have the capacity to house much memory. Computer memory is a critical component that directly impacts the processing speed and performance of the PDA. Furthermore, PDA memory is necessary to store data and instructions that a running computer program utilizes. Multi-functional and complex software applications, such as spreadsheet programs, require large amounts of memory to operate. As such, computer programs running on PDAs are limited in the functionality they can provide to a user by the amount of memory available.

PDA Spreadsheet Problems: Storage

A spreadsheet application requires a lot of memory to store individual documents. In addition, a spreadsheet program places a heavy demand on PDA memory when the application uses all of its intended features. Some of the features that tax the memory include complex functions, fonts, pictures, graphics, and help menus. Consequently, users encounter problems when they need to store spreadsheet documents, commonly referred to as files, which contain many of these attributes.

Spreadsheet File

A spreadsheet file contains a collection of data tabulated in a grid or matrix. The grid includes numbered horizontal rows and numbered vertical columns. Each space in the grid is termed a cell, and FIG. 9 shows an example of a spreadsheet file with 56 cells (7 columns and 8 rows). This example has text and numbers as cell entries, but could contain other information like date, time, special symbols like #, $, %, etc. The relationship between the cells can sometimes by controlled by formulas. FIG. 9 shows salary information for a company, including name of employees, their hourly rates, number of hours worked in the week, payroll deductions like FICA and SDI, and the gross and net pays. So, for example, the net pay is calculated using the formula (hours worked * rate/hour)−(FICA +SDI). By changing the value in the rate/hour column, or the hours worked column automatically changes the value in gross pay, net pay, FICA, and SDI columns because they are all dependant on the rate/hour as well as hours worked. Note that some of the cells do not contain data (empty cells). This is a common condition in spreadsheet files.

In one embodiment of the present invention, databases on a PDA utilize a record based storage medium. In other words, a PDA uses numerous records to store all of the information within an individual spreadsheet document. A record is essentially a group of related fields that store data about a subject or activity. In one embodiment, a record represents each spreadsheet cell and rewrites the data of each cell into a file. Although, this current method for cell storage within PDAs is straightforward, it is very inefficient and memory intensive. By assigning one record on the PDA to one cell of a spreadsheet file, many records are not fully utilized. This is because the cell data is not sufficient to completely take advantage of the storage space allocated to a record.

In addition, when users are working with spreadsheet applications, a spreadsheet file may have a large number of empty cells. Users may or may not use all of these empty cells; however, the spreadsheet application must link each cell to a record in order to store the information. Storing an empty cell in a data record wastes valuable PDA memory.

Although current systems are able to store all of this information properly, it is very taxing on the memory and performance of the PDA. Transferring data across various types of networks is increasing in popularity; especially in wireless networks between wireless enabled PDAs and telephones. However, current wireless systems are unable to transfer memory intensive files, such as spreadsheet documents, quickly and efficiently.

PDA Spreadsheet Problems: Output

Because PDAs have limited amounts of memory and small display screens, it is not possible for the companion software to support all of the fonts, font attributes, and paragraph styles that exist in the software designed for a desktop computer. For instance, changes made to a document on the PDA may not be visible until the user transfers the document to the desktop computer. Likewise, the format for the changes made to a document on the PDA may not be able to be set until the user transfers the document to the desktop computer.

In addition, other types of problems occur when users want to transfer PDA spreadsheet files. As previously discussed, the current structure of spreadsheet files requires a lot of memory for storage. In order to transfer data over cable or wireless networks, the data must be compressed. However, in its current state transferring files would be very slow and may not even be possible because spreadsheet files are too large.

PDA Spreadsheet Problems: Performance

The performance of a PDA may be defined as the speed at which the PDA processes information within a particular program. In addition, the performance also affects input recognition, output quality and processing, and other types of information evaluation, such as the computing of functions and formulas. The amount of available memory on the PDA is directly proportional to the performance of the device. In other words, the greater the amount available memory, the faster the PDA operates computer software programs.

Spreadsheet programs are complex applications that utilize a lot of PDA memory. Therefore, when users operate spreadsheet applications and other types of complex programs, it usually diminishes the performance of the PDA. Users typically find slow PDA performance to be a nuisance. When these delays occur, users usually have to wait for the PDA to update changes before the device is able to process additional information. This slow performance undoubtedly increases the amount of time it takes users to work on a particular project and may deter users from even using PDA spreadsheet programs.

SUMMARY OF THE INVENTION

The present invention provides a method and apparatus for a file format for storing spreadsheets compactly on PDAs. PDAs only contain a limited amount of computer memory due to their small size and processing ability. This limitation is demonstrated when users operate memory intensive programs, such as spreadsheet applications. For example, some limitations on the PDAs prevent users from visualizing their updated changes and prevent complex functions processing.

The present invention alleviates these problems by minimizing the amount of memory required to operate a spreadsheet application. This is accomplished by a number of features of the file format. For instance, instead of storing one cell per record, the invention stores multiple cells per record (e.g. up to 64 in one embodiment). Records are also used to store style, formatting, geometry, and other spreadsheet file information. The result is a more efficient use of memory on the PDA for the storage of cell data. In addition, empty cells are compressed so that less PDA storage space is needed to represent the empty cells. Therefore, the spreadsheet program can assign additional memory to increase performance and provide complete visualization and processing capabilities. The invention uses a collection of records to represent a spreadsheet file. In one embodiment, the invention stores spreadsheet file data in a first record. A second record stores access data of the spreadsheet file and cell data is stored on third or more records. The property data includes name, version, date information, and default cell format information of the spreadsheet file. Access data includes the number of columns accessed by the record and the cell IDs of the cells in the accessed columns. The third and other records each store a subset of the columns identified in the second record and the cell data includes the number of cells stored in the record and the data of the cells.

In order to reduce memory constraints caused by PDA spreadsheet applications, the present invention focuses on reducing memory allocated for file storage. This is accomplished by optimizing the compression of individual spreadsheet files within a database record storage system. This method reduces the overall storage of individual spreadsheets within a spreadsheet program. Consequently, the spreadsheet program can allocate excess memory to improve current features and functionality and activate previously unavailable ones.

The present invention's innovative use of database record storage enables all of these enhancements. The invention builds on database storage technology in a manner that optimizes data storage, location, and extraction within a spreadsheet application. Thus, the present invention's file format for compact storage creates additional memory that leads to significant improvements of PDA performance within a spreadsheet application.

BRIEF DESCRIPTION OF THE DRAWINGS

These and other features, aspects and advantages of the present invention will become better understood with regard to the following description, appended claims and accompanying drawings where:

FIG. 9 is an example of a spreadsheet file that may be used in an embodiment of the present invention.

DETAILED DESCRIPTION OF THE INVENTION

A method and apparatus for storing spreadsheets compactly on small devices is described. In the following description, numerous specific details are set forth in order to provide a more detailed description of the invention. It will be apparent, however, to one skilled in the art, that the present invention may be practiced without these specific details. In other instances, well known details have not been provided so as to not unnecessarily obscure the invention.

One or more embodiments of the present invention provide a file format for storing spreadsheets compactly on PDAs. PDAs are small devices that users can operate almost anywhere. Yet, due to their size and processing ability, PDAs only contain a limited amount of memory. This limitation is demonstrated when users operate programs that require large amounts of memory, such as spreadsheet applications. A spreadsheet application utilizes a lot of memory to store its individual documents called files.

However, an advantage is created by the present invention because it minimizes the amount of memory required by a PDA operating a spreadsheet application. In order to reduce the amount of PDA memory constraints, the present invention focuses on reducing the structure of the files for storage. The format should be able to represent sparse spreadsheets compactly. In practice, a number of spreadsheets have a large number of empty cells, and these need to be represented as compactly as possible to reduce the size of the spreadsheet. This requirement needs to be balanced with the need to be able to add data into these empty cells when the user desires.

The compression of the individual spreadsheet files reduces the overall memory requirements within a spreadsheet program. Consequently, the spreadsheet program can allocate the excess memory to improve spreadsheet features and functionality. With additional memory, a spreadsheet program can enhance current features and activate previously unavailable features. For example, the present invention improves performance within a spreadsheet application. Although the ability to view documents on small devices is important, it is beneficial to provide an advanced formatting option that can edit the documents and transfer changes back to the desktop or server. This is where the present invention distinguishes itself from prior art. Furthermore, this invention allows the application to represent formulas in spreadsheet and evaluate them quickly on a low power processor.

Figure 10:
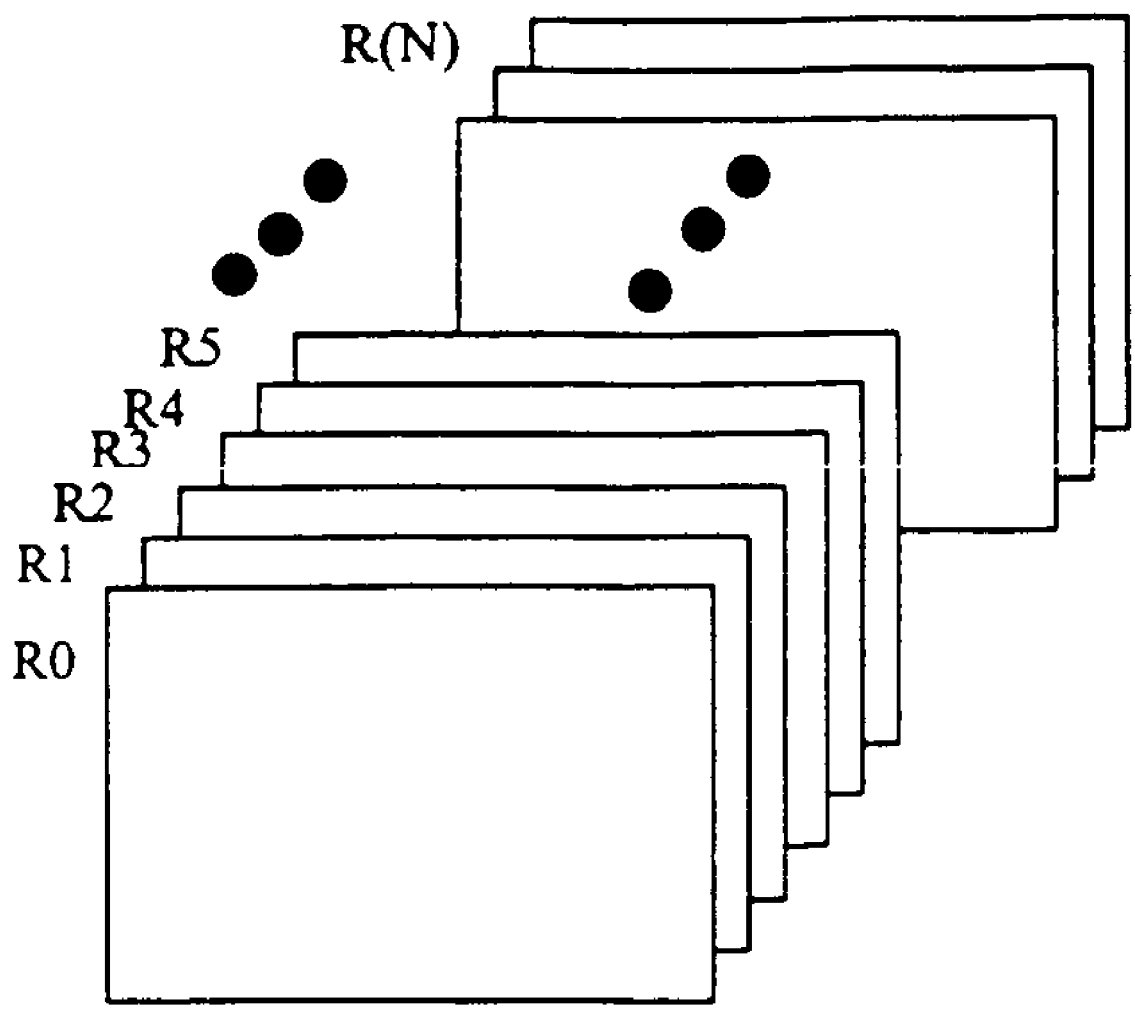
FIG. 10 is an example of spreadsheet file storage in records in one embodiment of the present invention.

FIG. 10 is a representation of how a spreadsheet file is stored in PDA memory. The spreadsheet file is stored as a series of records, taking advantage of the existing record based file structure of typical PDAs. In one embodiment of the present invention, the first record, R0, stores spreadsheet properties (it is the properties record). The spreadsheet properties record is used to store properties that are needed by the spreadsheet. For example, the spreadsheet properties record is comprised of general information, such as the size of the sheet, name of the sheet, date the sheet was created, date modified, date synchronized, number of rows and columns, and other information. The following is a map of record R0 in one embodiment of the invention.

| Map of Record 0 ("Where" is the location in the record in bytes): | | |
|---|---|---|
| Where | Name | Description |
| 0-1 | versionDB | A version number for the DB we are using |
| 2-3 | numRows | Number of rows in the spreadsheet |
| 4-5 | numCols | Number of columns in the spreadsheet |
| 6-7 | sizeofSheetName | Size of the sheetName string stored in data []. This value includes the size of the termination string. |
| 8-9 | sizeofDesktopURL | Size of the desktopURL string stored in data []. This value includes the size of the termination string. |
| 10 | sized | A SizedDataType value indicating if the spreadsheet has been sized yet. It is normally set to eSizedNotSized (zero) by the conduit when creating the database. When set to eSizedNotSized, the application will fill in the SGridCol.width values in the SGridRecord records. The width values will be based on the size of the currently selected font. Size will be set to eSizedStdFont if the standard font is used in the width calculations. It will be set to eSizedLargeFont if the large font is used in the width calculations. |
| 11 | pad | A padding character so that we are aligned on even byte boundaries. |
| 12-15 | nullDate | The null date used by the spreadsheet date function. |
| 16-19 | dateCreated | The date the spreadsheet was created. |
| 20-23 | dateSynced | The date that the spreadsheet was last synchronized with the desktop. |
| 24-27 | dateLastModified | The date the spreadsheet was last modified on the PDA. |
| 28-29 | defaultIntFormat | The default display format for integers. |
| 30-31 | defaultFloatFormat | The default display for floats. |
| 32-33 | defaultBooleanFormat | The default display for booleans. |
| 34-35 | defaultPercentFormat | The default display for percent. |
| 36-37 | defaultTimeFormat | The default display for time. |
| 38-39 | defaultDateFormat | The default display for date. |
| 40-41 | defaultDateTimeFormat | The default display for dateTime. |
| 42-43 | defaultCurrencyFormat | The default display format for currency. |
| 44- | data | The data section of this record consists of 2 text strings of unknown length. The strings are defined as: |
| | sheetName | A null terminated string representing the name of the spreadsheet. |

-continued

| Map of Record 0 ("Where" is the location in the record in bytes): | | |
|---|---|---|
| Where | Name | Description |
| | desktopURL | A null terminated string representing the name of the document on the desktop. |

The next four records, R1-R4, are referred to as grid records. The grid record is used to index into the spreadsheet properties record. In addition, the width of each column is stored in the grid record. A grid record stores a matrix that is used to access the correct database records when trying to obtain data from a particular cell in a database (as seen below, cell data is mapped into records as well). In one embodiment, four grid records are reserved for use even if not all four are actually required for a particular spreadsheet file. In another embodiment, an entry in the first grid record could indicate how many grid records there are. In this way, more efficient use of the records can be achieved. The grid records stores the starting column for the cells associated with this particular grid record, the number of columns stored, column width, and cell IDs to index the rest of the database. In one embodiment, a first number of bits (e.g. 10) are used to identify the record number where the data for a cell at column i, row j is located. The next number of bits (e.g. 6) gives the offset in the record. The following is a map of records R1-R4 in one embodiment.

| Map of Records 1-4 ("Where" is the location in the record in bytes): | | |
|---|---|---|
| Where | Name | Description |
| 0-1 | colStart | The starting column number for this SGridRecord. |
| 2-3 | numColsInRec | The number of columns that are stored in SGridRecord.data []. |
| 4- | data | The data section of this record consists of an array of SGridCol structures. |
| | col [] | An array of SGridCol structures. This array consists of numColsInRec elements. |
| | col [i].width | The width (in pixels) of spreadsheet column i. |
| | col [i].cellIDs [j] | Cell IDs in an array of UInt16s consisting of SSheetProperties.numRows elements. Each element (a cell id) is used to look up column I and row j cell data in the database. The UInt16s/cell id stored in this array allow us to index into the rest of the database. The first 10 bits of the UInt16 gives us the record number where the data for (column i, row j) is stored. The final 6 bits provide us with the correct offset in the record. This indexing method is necessary since we store the data for up to 64 cells in 1 SCellRecord record., |

Records R5 through R(N) consist of cell records and store individual cell data and information as described in the map below.

| Map of Record 5 and above ("Where" is the location in the record in bytes): | | |
|---|---|---|
| Where | Name | Description |
| 0-1 | cellsInRecord | The number of spreadsheet cell data stored in this record. This value must be less than or equal to 64. |
| 2- | data [] | data consists of 2 arrays, offset, an array of UInt16s and data, an array of SCellDataType structs. |
| | offset | offset [] is an array of UInt16s consisting of cells InRecord+1 elements. Each element of the array contains an offset value, in bytes, that is used to extract a SCellDataType struct for a cell from the current record. For Example: if offset [5] is 554, then the start of the SCellDataType struct corresponding to "cell 5", will begin 554 bytes into this record. We keep 1 offset more than cellsInRecord so that we can easily determine where the next SCellDataType struct will begin when we add a new cell. |
| | data | data [] is an array of SCellDataType structs. This struct contains information specific to a spreadsheet cell. |
| | data.type | The type of data (int, float, etc . . . ) stored in the cell. This is a SheetDataType 16-bit enum. |
| | data.format | The format that the data in the cell should be displayed as. This is a SheetFormatTyped 16-bit enum. |
| | data.SizeofDisplayString | Size of the data.displayString string. This value includes the size of the termination character. |
| | data.sizeofDisplayFormula | Size of the data.displayFormula string. This value includes the size of the termination character. |
| | data.sizeofParsedFormula | Size of the data.parsedFormula string. This value includes the size of the termination character. |
| | data.data | The actual data stored in the cell and the size of this value varies depending on the type. For float, currency, time, date, DateTimeType, and percent types, we store the data as a FlpCompDouble (64 bit) type. For int and boolean types, we store the data as an Int32 (32 bits). We do not store anything here for the string datatype. The value for the string datatype would be the same as that stored in the data.displayString. |
| | data.parsedFormula | A null terminated string containing a string representation of the parsed formula. The data in the string is in Reverse Polish Notation and is never displayed to the user. This value is only accessed internally. If the cell does not contain a formula, this string does not exist. |
| | data.displayString | A null terminated string containing a string representation of the data in data.data. This is the value displayed to the user in a spreadsheet cell. |
| | data.displayFormula | A null terminated string containing a string representation of the formula for a cell. This is the formula that will be displayed to the user in the text edit field when the user clicks on a cell that |

-continued

Map of Record 5 and above
("Where" is the location in the record in bytes):

| Where | Name | Description |
|---|---|---|
| | | contains a formula. If the cell does not contain a formula, this string does not exist. |

In one embodiment, the number of instances of data is stored in a space represented by cellsInRecord (e.g. 30). The number of offset values is cellsInRecord +1 (e.g. 31). This makes it unnecessary to calculate the proper offset value if data is added. The above descriptions are for purposes of example only. Other configurations and mappings of bits and records can be used without departing from the scope and spirit of the present invention. There may be situations where more or less than 64 cells are stored per record, depending on cell size and record size. In addition, the cell ID may be a different length than 16 bits. It could be greater or less than that length, e.g. 32 bits, 64 bits, etc.

Empty Cells

In the grid record, each element is used to look up column i and row j. If there is no data for that cell, the grid record includes a value of 0. That means that there is no data in the cell, so that no data need be stored for that cell in the cell record. If data were to be added to that cell later, the entry in the grid record would be updated to point to the appropriate entry in the cell record. So, each cell has a grid record entry, whether empty or not, but only cells with data have an entry in the cell record, saving storage space.

Figure 1:
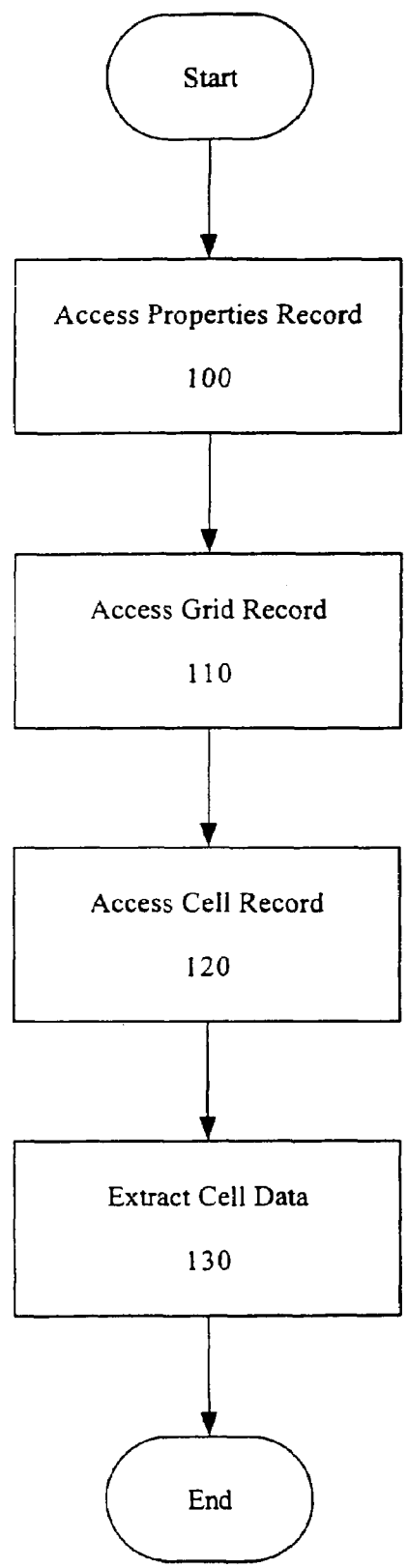
FIG. 1 is a flowchart showing how to locate and extract cell data from a specific cell in a spreadsheet properties record according to one embodiment of the present invention.

FIG. 1 is a flowchart showing how to locate and extract cell data from a specific cell according to one embodiment of the present invention. First, at step 100, the properties record is accessed. Next, at step 110, a grid record is accessed. At step 120, a cell record is accessed. The bulk of the database consists of cell records. A cell record contains a set of spreadsheet cell data for up to sixty-four (64) spreadsheet cells according to one embodiment of the present invention. Finally, at step 130, cell data is extracted.

Figure 2:
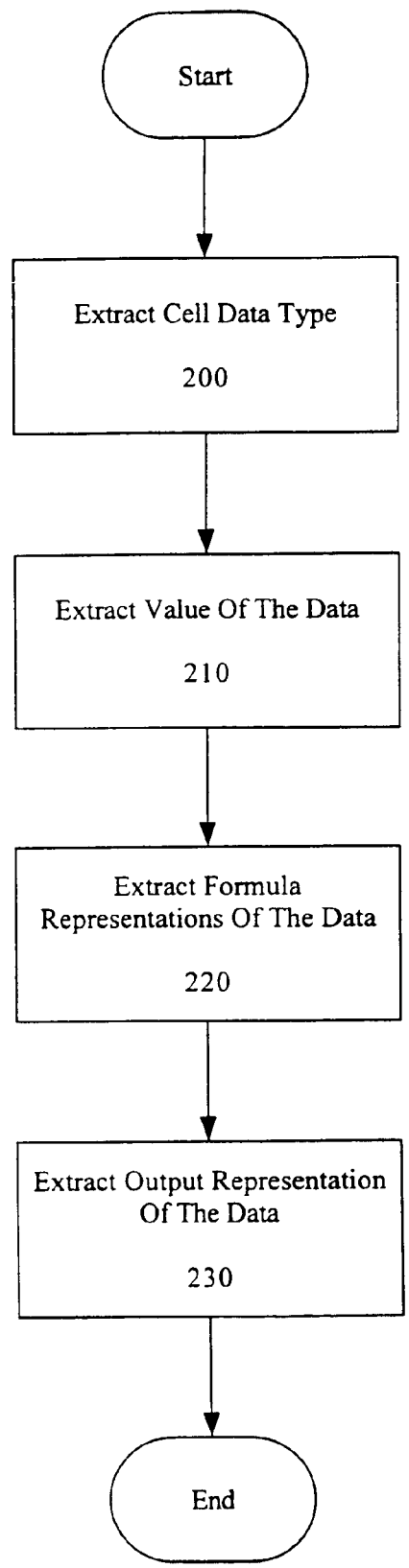
FIG. 2 is a flowchart showing the different types of information that can be extracted from a specific cell in a spreadsheet properties record according to one embodiment of the present invention.

FIG. 2 is a flowchart showing the different types of information that can be extracted from a specific cell in a cell record according to one embodiment of the present invention. First, at step 200, a cell data type is extracted. The cell data types can comprise of integers, floats, Boolean, percentage, time, currency, character strings, and dates. Next, at step 210, value of the data is extracted. The values of the data comprise integer values, floating point values, and date values. At step 220, formula representations of the data are extracted. At step 230, output representation of the data is extracted.

The file format provided by the present invention is able to handle multi-byte character sets in the code (i.e., internationalizable). A character set is a group of unique symbols used for display and printing. Character sets for alphabet-based languages, such as English and Spanish, generally contain 256 symbols, which is the number of combinations one byte can hold. (It should be noted that the invention is not limited to character sets that contain 256 symbols. Other sized character sets can be used with the present invention by using more or less than one byte to support the character set). In addition, the format can process varying degrees of scalability to scale to different classes of handheld devices and account for large and small display screens. For example, the present invention can perform scalability from a cell phone with a single font and an 80×100 pixel screen to a PDA that contains several fonts and 160×160 pixel screen.

Figure 3:
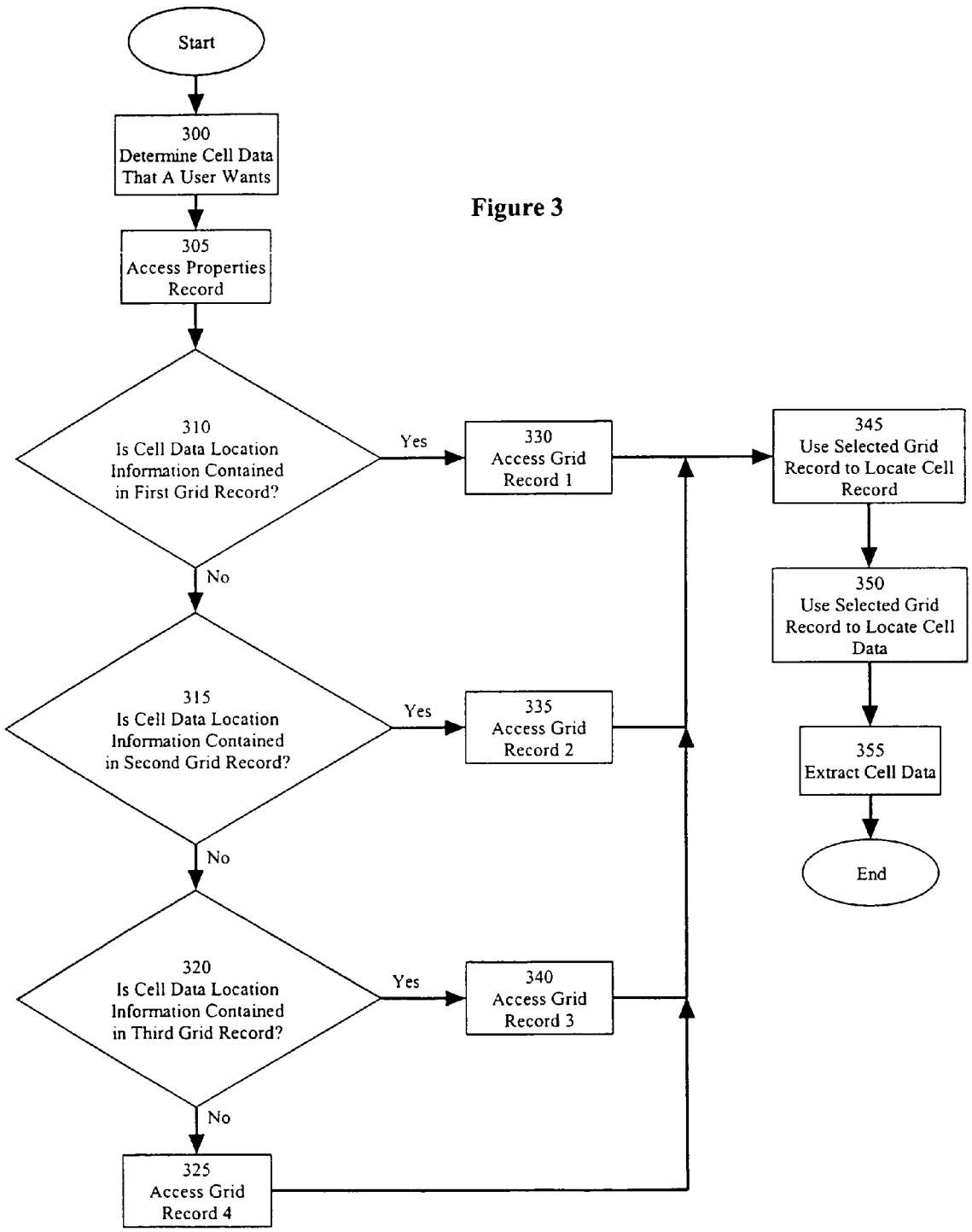
FIG. 3 is a flowchart showing how to utilize grid records to locate and extract cell data from a specific cell in a spreadsheet properties record according to one embodiment of the present invention.

FIG. 3 is a flowchart showing how to utilize grid records to locate and extract cell data from a specific cell in a spreadsheet properties record according to one embodiment of the present invention. First, at step 300, cell data that a user wants is determined. At step 305, the properties record is accessed. At step 310, it is determined if the cell data location information is contained in the first grid record. This is accomplished by comparing the column number of the cell data to be accessed to the range of column numbers stored in that grid record. If the desired column number is within the range, the cell data is found in that grid record. If not, the next grid record is examined and so on.

In one embodiment, four records in the database each represent a grid record. However, the initial limitation of four grid records may be increased or decreased. If the spreadsheet is small enough and only one grid record is required for storage, the rest of the grid records may be left empty. On the other hand, if all four grid records are used for storage, a user may have to check all four grid records sequentially to locate the information a user needs.

Next, if the cell data location information is contained in the first grid record, at step 330, grid record 1 is accessed. If the cell data location information is not contained in the first grid record, at step 315, it is determined if the cell data location information is contained in the second grid record. If the cell data location information is contained in the second grid record, at step 335, grid record 2 is accessed. However, if the cell data location information is not contained in the second grid record, at step 320, it is determined if the cell data location information is contained in the third grid record. If the cell data location information is contained in the third grid record, at step 340, grid record 3 is accessed. If the cell data location information is not contained in the third grid record, at step 325, grid record four is accessed.

The search to determine which grid record we need is based on the column number. Each grid record contains the value of the first column, and the total number of columns in that record. By comparing the column values, one can easily determine the grid record needed. At step 345, the selected grid record is used to locate the cell record. The selected grid record is either grid record 1, grid record 2, grid record 3, or grid record 4, depending on which grid record contains the cell record location information. Next, at step 350, the selected grid record is used to locate the cell data. Finally, at step 355, the cell data a user wants is extracted.

Figure 4:
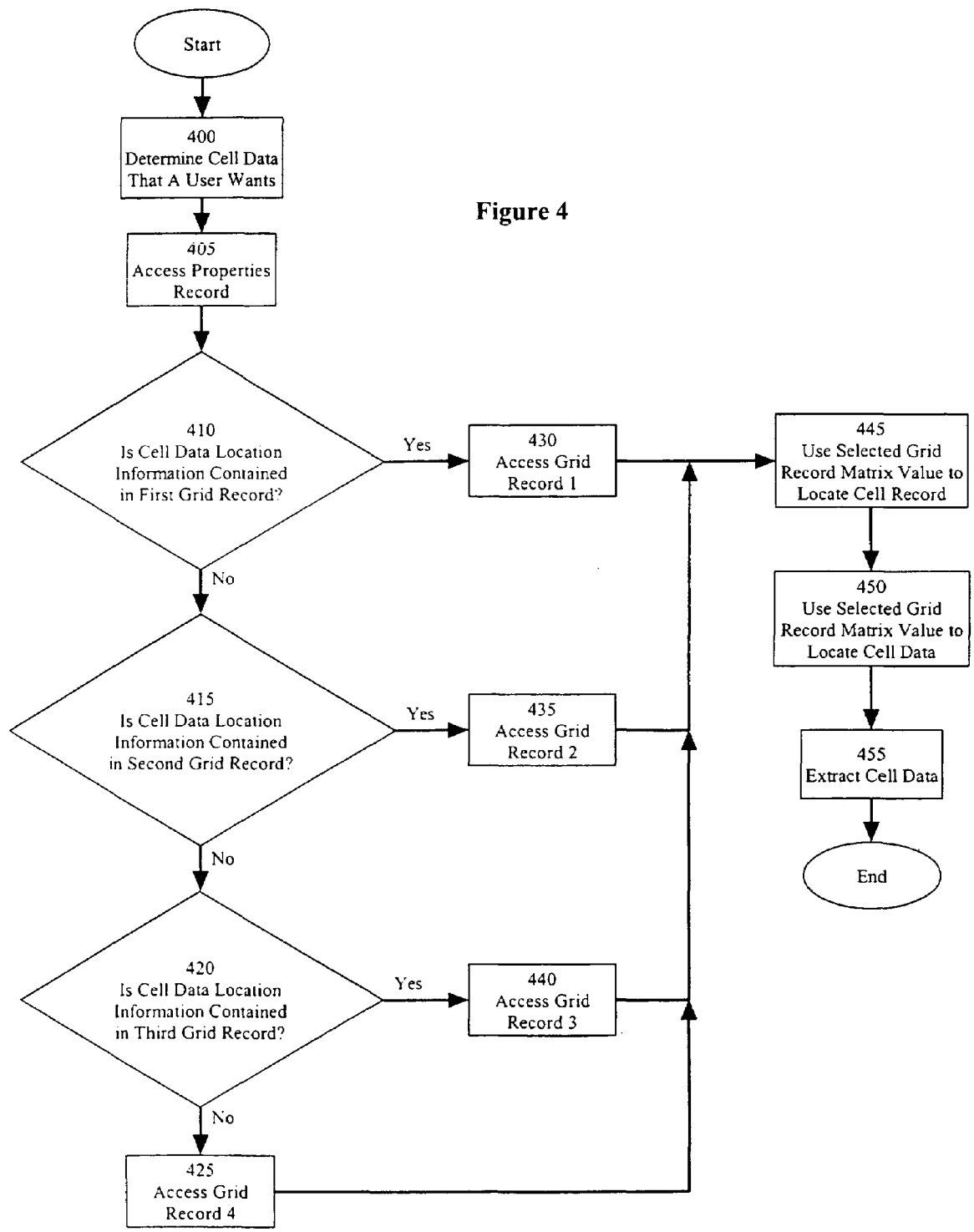
FIG. 4 is a flowchart showing how to utilize matrix values from grid records to locate and extract cell data from a specific cell in a spreadsheet properties record according to one embodiment of the present invention.

FIG. 4 is a flowchart showing how to utilize matrix values from grid records to locate and extract cell data from a specific cell in a spreadsheet properties record according to one embodiment of the present invention. First, at step 400, cell data that a user wants is determined. At step 405, the properties record is accessed. At step 410, it is determined if the cell data location information is contained in the first grid record. If the cell data location information is contained in the first grid record, at step 430, grid record 1 is accessed. However, if the cell data location information is not contained in the first grid record, at step 415, it is determined if the cell data location information is contained in the second grid record.

Next, if the cell data location information is contained in the second grid record, at step 435, grid record 2 is accessed. However, if the cell data location information is not contained in the second grid record, at step 420, it is determined if the cell data location information is contained in the third grid record. If the cell data location information is contained in the third grid record, at step 440, grid record 3 is accessed. If the cell data location information is not contained in the third grid record, at step 425, grid record four is accessed.

As explained earlier (FIG. 3), the grid record needed is easily determined by comparing the column values. Next, at step 445, the selected grid record matrix value is used to locate the cell record. Next, at step 450, the selected grid record matrix value is used to locate the cell data. Finally, at step 455, the cell data a user wants is extracted.

Figure 5:
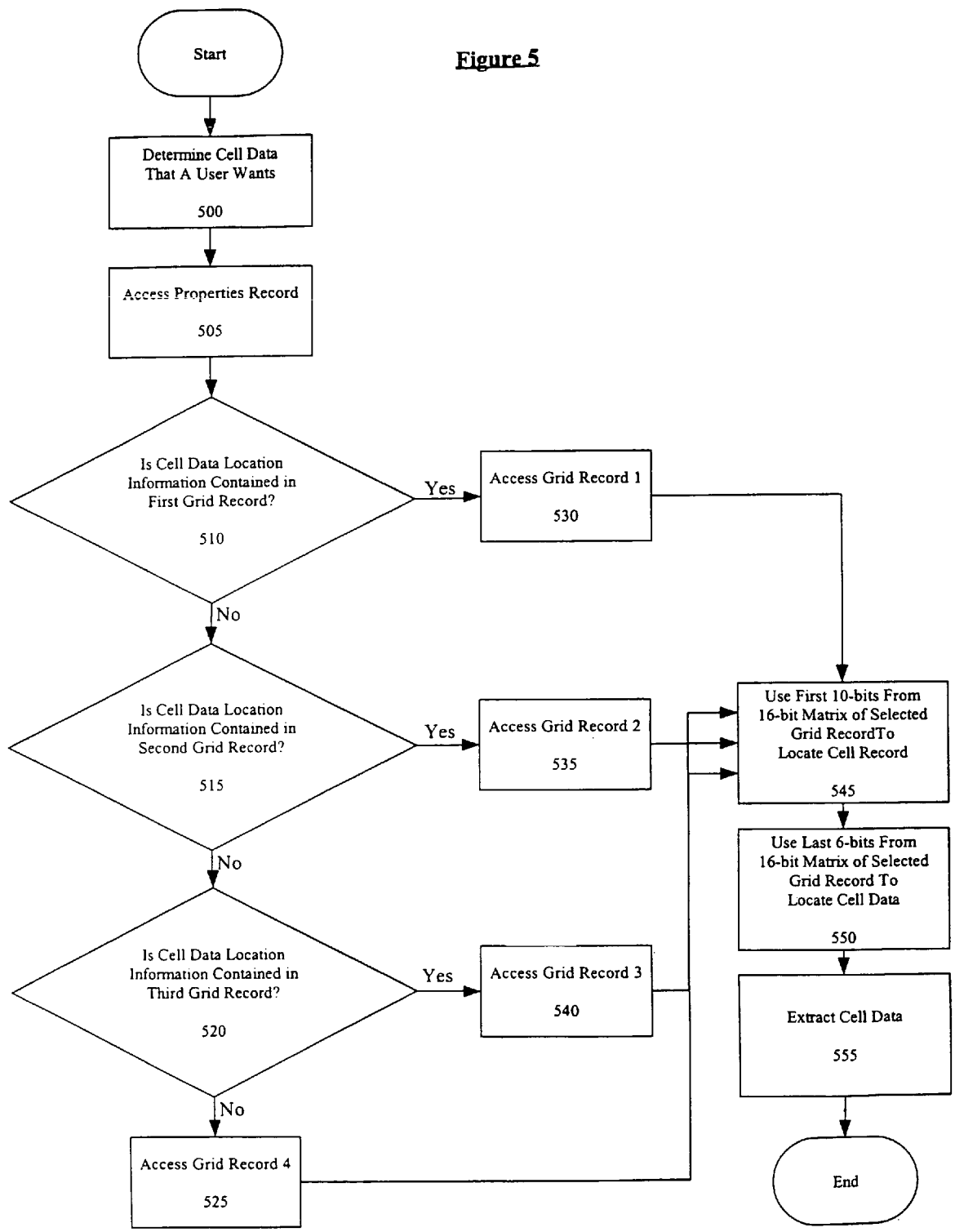
FIG. 5 is a flowchart showing how to utilize matrix values from grid records to locate and extract cell data from a specific cell in a spreadsheet properties record according to one embodiment of the present invention.

FIG. 5 is a flowchart showing how to utilize matrix values from grid records to locate and extract cell data from a specific cell in a spreadsheet properties record according to one embodiment of the present invention. First, at step 500, cell data that a user wants is determined. Next, at step 505, the properties record is accessed. At step 510, it is determined if the cell data location information is contained in the first grid record. If the cell data location information is contained in the first grid record, at step 530, grid record 1 is accessed. However, if the cell data up location information is not contained in the first grid record, at step 515, it is determined if the cell data location information is contained in the second grid record.

Next, if the cell data location information is contained in the second grid record, at step 535, grid record 2 is accessed. However, if the cell data location information is not contained in the second grid record, at step 520, it is determined if the cell data location information is contained in the third grid record. If the cell data location information is contained in the third grid record, at step 540, grid record 3 is accessed. If the cell data location information is not contained in the third grid record, at step 525, grid record four is accessed.

As explained earlier (FIG. 3), the grid record needed is easily determined by comparing the column values. Next, at step 545, the selected grid record matrix is used to locate the cell record. The selected grid record matrix contains a sixteen (16) bit value. The first ten (10) bits from the 16-bit matrix value contains the location information for the cell record that contains the desired cell data. Next, at step 550, the selected grid record matrix value is used to locate the cell data from within the located cell record. The last six (6) bits from the selected grid record 16-bit matrix value contains the location information for the desired cell data within the cell data record determined at step 545. Finally, at step 555, the cell data a user wants is extracted. If there is no data in the cell being looked up by the user, the data record value as well as the offset value will both be zero. Hence, according to one embodiment of the invention space is not wasted on empty cells.

Figure 6:
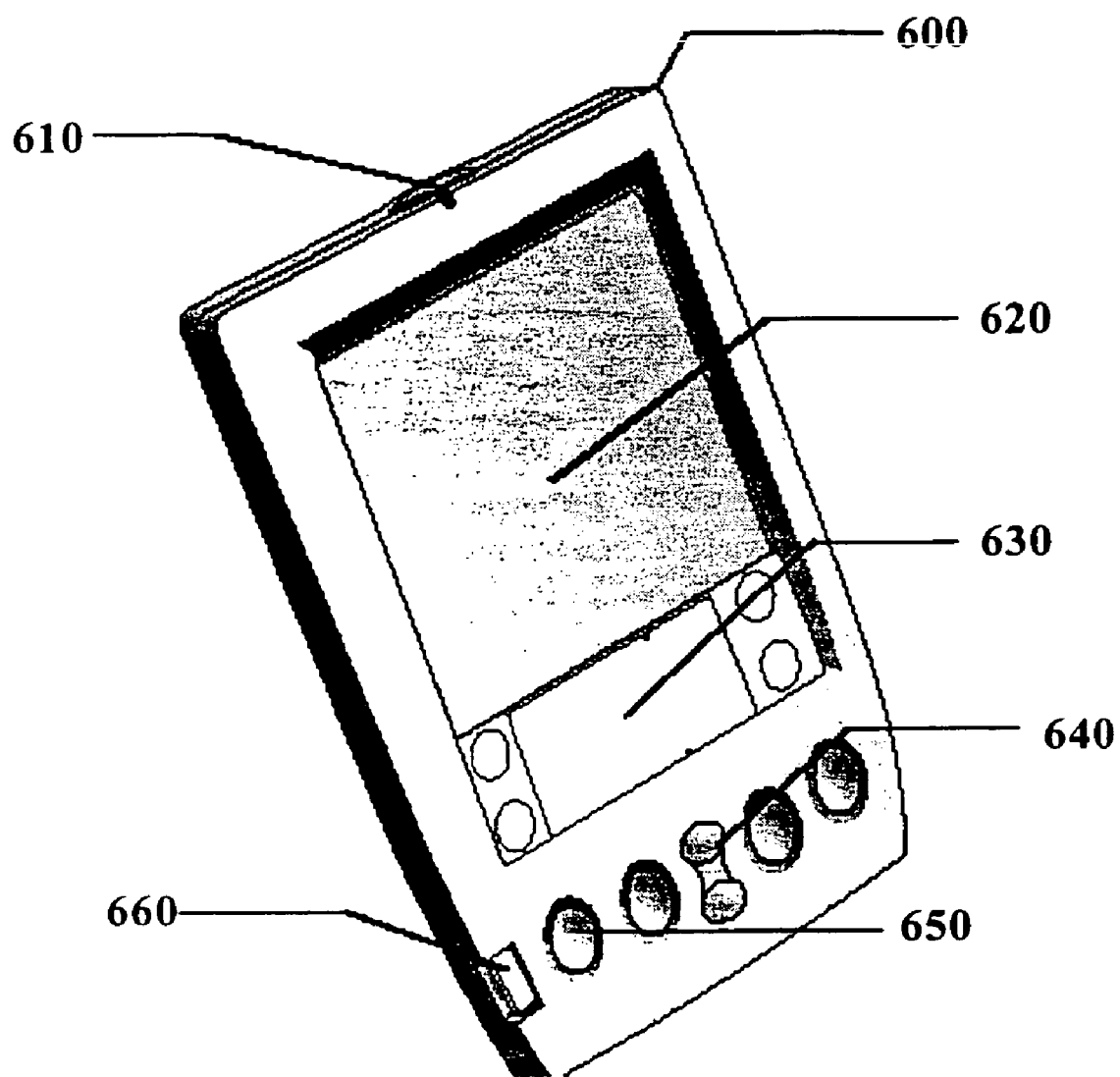
FIG. 6 is an illustration of one embodiment of a personal digital assistant.

FIG. 6 is an illustration of one embodiment of a personal digital assistant (PDA), such as a handheld computing device manufactured by Palm™. However, it will be apparent to one with ordinary skill in the art that the present invention can be used with any suitable spreadsheet software application on any suitable small device computer system. PDA 600 has a base housing 610 usually with input mechanisms mounted on its topside, and a miniature display screen 620 for output. The output may take the form of graphic and/or textual images presented to the user on the display screen. In addition, the output may be presented in the form of sound.

PDA 600 can be activated and de-activated, for instance, by accessing power button 660. The input mechanism may be, for example, a miniature keyboard (not shown). Alternatively, the display screen 620 may act as both an input and output mechanism with a pen-like stylus or other writing implement (not shown) used to introduce input by way of the screen 620. With reference to FIG. 6, bottom portion 630 of display screen 620 is where the pen-like stylus would introduce user input. Shown in FIG. 6 are additional mechanisms for user input as well, including a scroll button 640 and an application button 650. A small microprocessor, limited data storage and memory areas, and a storage battery are typically mounted within the base housing 610 of the PDA along with various other miniature electronic components and ports.

Conduits

Figure 7:
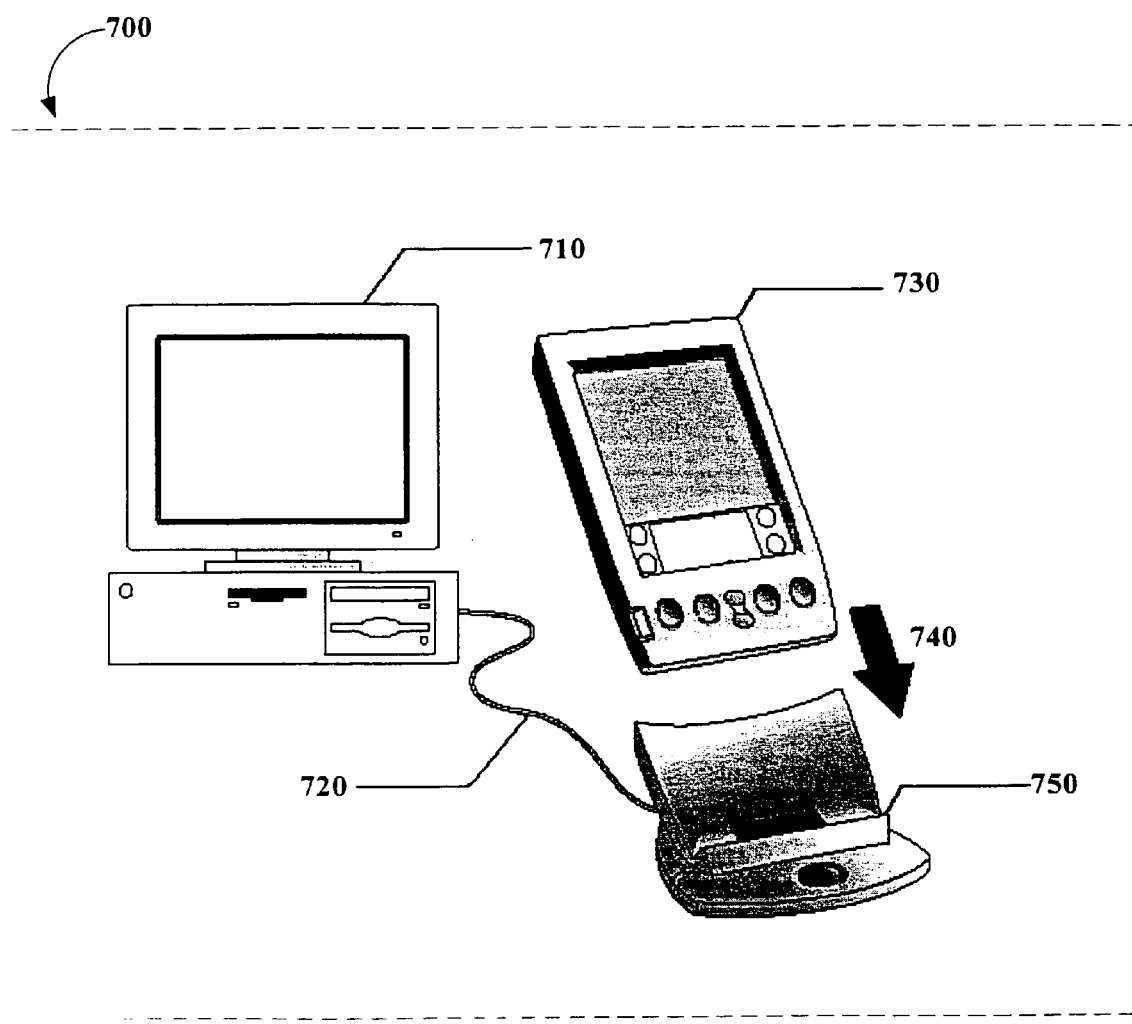
FIG. 7 is an illustration of one embodiment of a personal digital assistant coupled with a desktop computer.

FIG. 7 is an illustration of one embodiment of a personal digital assistant coupled with a desktop computer. FIG. 7 is designed to generally indicate how a user transfers data from a desktop computer 710 to a PDA 730, or vice versa. Desktop computer 710 is coupled to PDA carriage 750 via a connecting line 720. The connecting line 720 represents a conduit.

A conduit provides a two-way data communication coupling via a desktop computer 710 to a PDA 730. Although, conduit 720 represents a cable connection, it will be apparent to one skilled in the art, that the present invention may be practiced with numerous types of connections. For example, if the connection is an integrated services digital network (ISDN) card or a modem, the conduit provides a data communication connection to the corresponding type of telephone line. Additionally, wireless links are available to the present invention. In any such implementation, the connection sends and receives electrical, electromagnetic or optical signals, which carry digital data streams representing various types of information.

In operation, a user would insert PDA 730 into carriage 750 in the direction generally indicated by the black arrow 740. Thereafter, data is passed bi-directionally across conduit 720 to achieve the result of either transferring the user's data from PDA 730 to desktop computer 720, or vice versa.

Embodiment of a Computer Execution Environment

Figure 8:
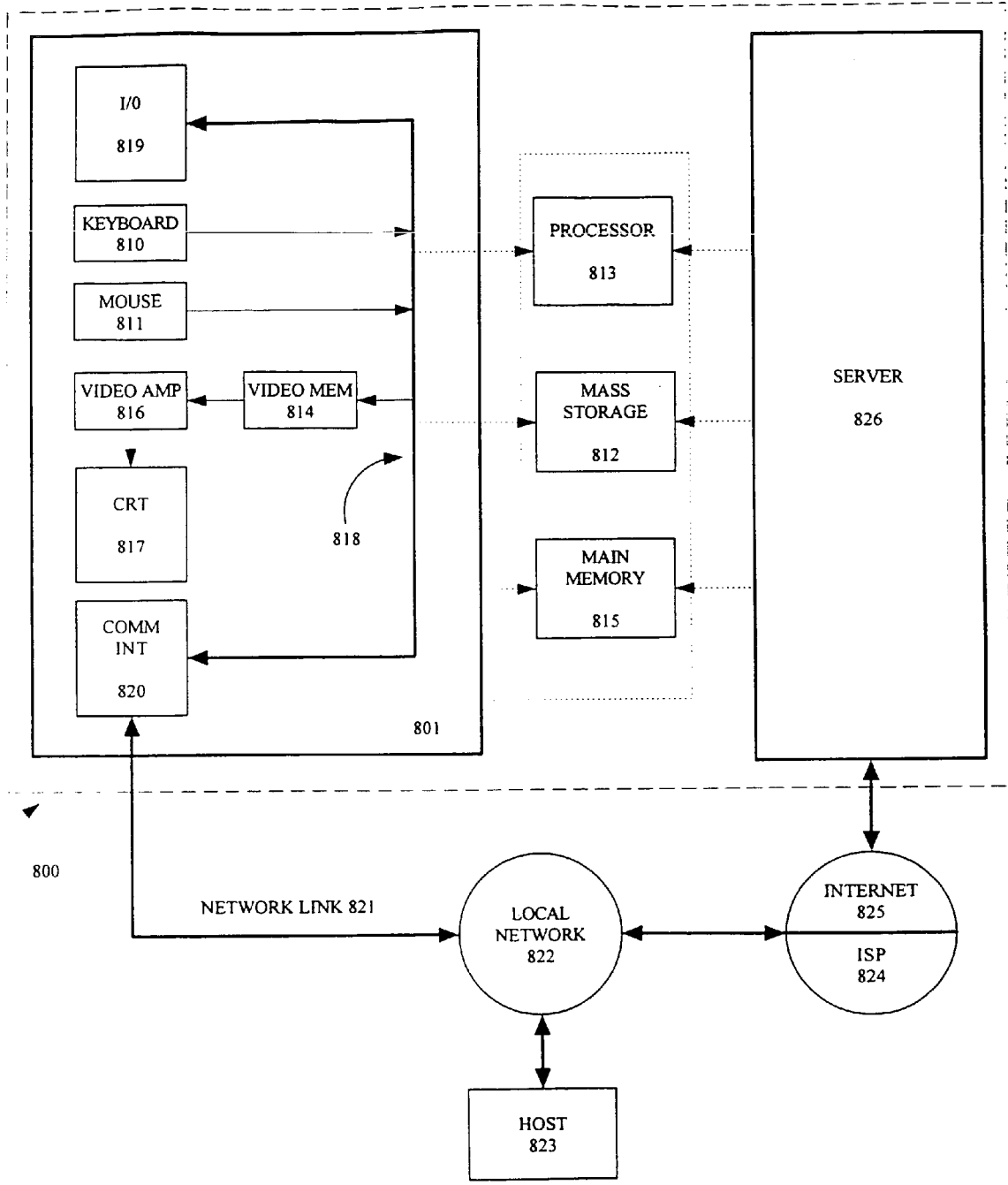
FIG. 8 is an illustration of an embodiment of a computer execution environment that may be used in an embodiment of the present invention.

An embodiment of the invention can be implemented as computer software in the form of computer readable code executed in a general purpose computing environment such as environment 800 illustrated in FIG. 8, or in the form of bytecode class files running in such an environment. A keyboard 810 and mouse 811 are coupled to a bi-directional system bus 818. The keyboard and mouse are for introducing user input to a computer 801 and communicating that user input to processor 813.

Computer 801 may also include a communication interface 820 coupled to bus 818. Communication interface 820 provides a two-way data communication coupling via a network link 821 to a local network 822. For example, if communication interface 820 is an integrated services digital network (ISDN) card or a modem, communication interface 820 provides a data communication connection to the corresponding type of telephone line, which comprises part of network link 821. If communication interface 820 is a local area network (LAN) card, communication interface 820 provides a data communication connection via network link 821 to a compatible LAN. Wireless links are also possible. In any such implementation, communication interface 820 sends and receives electrical, electromagnetic or optical signals, which carry digital data streams representing various types of information.

Network link 821 typically provides data communication through one or more networks to other data devices. For example, network link 821 may provide a connection through local network 822 to local server computer 823 or to data equipment operated by ISP 824. ISP 824 in turn provides data communication services through the world wide packet data communication network now commonly referred to as the "Internet" 825. Local network 822 and Internet 825 both use electrical, electromagnetic or optical signals, which carry digital data streams. The signals through the various networks and the signals on network link 821 and through communication interface 820, which carry the digital data to and from computer 800, are exemplary forms of carrier waves transporting the information.

Processor 813 may reside wholly on client computer 801 or wholly on server 826 or processor 813 may have its computational power distributed between computer 801 and server 826. In the case where processor 813 resides wholly on server 826, the results of the computations performed by processor 813 are transmitted to computer 801 via Internet 825, Internet Service Provider (ISP) 824, local network 822 and communication interface 820. In this way, computer 801 is able to display the results of the computation to a user in the form of output. Other suitable input devices may be used in addition to, or in place of, the mouse 811 and keyboard 810. I/O (input/output) unit 819 coupled to bi-directional system bus 818 represents such P/O elements as a printer, A/V (audio/video) P/O, etc.

Computer 801 includes a video memory 814, main memory 815 and mass storage 812, all coupled to bi-directional system bus 818 along with keyboard 810, mouse 811 and processor 813.

As with processor 813, in various computing environments, main memory 815 and mass storage 812, can reside wholly on server 826 or computer 801, or they may be distributed between the two. Examples of systems where processor 813, main memory 815, and mass storage 812 are distributed between computer 801 and server 826 include the thin-client computing architecture developed by Sun Microsystems, Inc., PDAs, Internet ready cellular phones, and other Internet computing devices.

The mass storage 812 may include both fixed and removable media, such as magnetic, optical or magnetic optical storage systems or any other available mass storage technology. Bus 818 may contain, for example, thirty-two address lines for addressing video memory 814 or main memory 815. The system bus 818 also includes, for example, a 32-bit data bus for transferring data between and among the components, such as processor 813, main memory 815, video memory 814, and mass storage 812. Alternatively, multiplex data/address lines may be used instead of separate data and address lines.

In one embodiment of the invention, the processor 813 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 815 is comprised of dynamic random access memory (DRAM). Video memory 814 is a dual-ported video random access memory. One port of the video memory 814 is coupled to video amplifier 816. The video amplifier 816 is used to drive the cathode ray tube (CRT) raster monitor 817. Video amplifier 816 is well known in the art and may be implemented by any suitable apparatus. This circuitry converts pixel data stored in video memory 814 to a raster signal suitable for use by monitor 817. Monitor 817 is a type of monitor suitable for displaying graphic images.

Computer 801 can send messages and receive data, including program code, through the network(s), network link 821, and communication interface 820. In the Internet example, remote server computer 826 might transmit a requested code for an application program through Internet 825, ISP 824, local network 822 and communication interface 820. The received code may be executed by processor 813 as it is received, and/or stored in mass storage 812, or other non-volatile storage for later execution. In this manner, computer 800 may obtain application code in the form of a carrier wave. Alternatively, remote server computer 826 may execute applications using processor 813, and utilize mass storage 812, and/or video memory 815. The results of the execution at server 826 are then transmitted through Internet 825, ISP 824, local network 822, and communication interface 820. In this example, computer 801 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for a file format for storing spreadsheets compactly on small devices is described in conjunction with one or more specific embodiments. The invention is defined by the claims and their full scope of equivalents.

We claim:

1. A method in a data processing apparatus for accessing cell data of a spreadsheet file cell in a record-based computer readable-medium, comprising:
    determining whether cell data location information for a selected spreadsheet file cell is contained in a first grid record of a plurality of grid records, each grid record storing a mapping between a plurality of spreadsheet file cells and the location of their corresponding cell data location information in a cell data record implemented in the record-based computer readable-medium;
    if the cell data location information is contained in the first grid record, determining the cell data location information from the first grid record;
    determining the location of cell data corresponding to the spreadsheet file cell in the cell data record based on the cell data location information; and
    extracting the cell data from the cell data record,
    wherein the cell data location information indicates the location of cell data in the cell data record, the cell data location information is a 16 bit matrix, and the first 10 bits of the 16 bit matrix indicate the cell data record containing the cell data, and the last 6 bits of the 16 bit matrix indicated the location of the cell data within the cell data record.

2. The method of claim 1, further comprising:
    if the cell data location information is not contained in the first grid record, determining whether the cell data location information is contained in a second grid record.

3. The method of claim 2, wherein determining whether cell data location information for a selected spreadsheet file cell is contained in a first grid record includes comparing a column number of the spreadsheet file cell to a column value range of the second grid record.

4. The method of claim 1, further comprising:
    determining from a property record property information of the spreadsheet file.

5. The method of claim 1, wherein determining whether cell data location information for a selected spreadsheet file cell is contained in a first grid record includes comparing a column number of the spreadsheet file cell to a column value range of the first grid record.

6. The method of claim 1, where the cell data location information indicates a value of zero if the spreadsheet file cell is empty.

7. The method of claim 1, wherein the data processing apparatus is a personal digital assistant.

8. A computer-readable medium having stored thereon computer-executable instructions for causing a computer to execute a method for accessing cell data of a spreadsheet file cell in a record-based memory, the method comprising the steps of:
   determining whether cell data location information for a selected spreadsheet file cell is contained in a first grid record of a plurality of grid records, each grid record storing a mapping between a plurality of spreadsheet file cells and the location of their corresponding cell data location information in a cell data record implemented in the record-based computer readable-medium;
   if the cell data location information is contained in the first grid record, determining the cell data location information from the first grid record;
   determining the location of cell data corresponding to the spreadsheet file cell in the cell data record based on the cell data location information; and
   extracting the cell data from the cell data record,
   wherein the cell data location information indicates the location of cell data in the cell data record, the cell data location information is a 16 bit matrix, and the first 10 bits of the 16 bit matrix indicate the cell data record containing the cell data, and the last 6 bits of the 16 bit matrix indicated the location of the cell data within the cell data record.

9. The computer-readable medium of claim 8, further comprising the step of:
   if the cell data location information is not contained in the first grid record, determining whether the cell data location information is contained in a second grid record.

10. The computer-readable medium of claim 9, wherein determining whether-cell data location information for a selected spreadsheet file cell is contained in a first grid record includes comparing a column number of the spreadsheet file cell to a column value range of the second grid record.

11. The computer-readable medium of claim 8, further comprising the step of:
   determining from a property record property information of the spreadsheet file.

12. The computer-readable medium of claim 8, wherein determining whether cell data location information for a selected spreadsheet file cell is contained in a first grid record includes comparing a column number of the spreadsheet file cell to a column value range of the first grid record.

13. The computer-readable medium of claim 8, where the cell data location information indicates a value of zero if the spreadsheet file cell is empty.

14. The computer-readable medium of claim 8, wherein the computer-readable medium is contained in a personal digital assistant.

* * * * *